US011231233B2

(12) United States Patent
Choi et al.

(10) Patent No.: US 11,231,233 B2
(45) Date of Patent: Jan. 25, 2022

(54) DOUBLE-PIPE HEAT EXCHANGER INCLUDING INTEGRATED CONNECTOR

(71) Applicant: HS R & A Co.,Ltd., Yangsan-si (KR)

(72) Inventors: Jae Hyeok Choi, Yangsan-si (KR); Deok Hyun Lim, Yangsan-si (KR); Young Jun Kim, Yangsan-si (KR); Ho Ju Jeon, Busan (KR)

(73) Assignee: HS R & A CO., LTD., Yangsan-si (KR)

( * ) Notice: Subject to any disclaimer, the term of this patent is extended or adjusted under 35 U.S.C. 154(b) by 43 days.

(21) Appl. No.: 16/891,847

(22) Filed: Jun. 3, 2020

(65) Prior Publication Data

US 2020/0386483 A1 Dec. 10, 2020

(30) Foreign Application Priority Data

Jun. 4, 2019 (KR) .................. 10-2019-0066009

(51) Int. Cl.
| | |
|---|---|
| *F28F 1/00* | (2006.01) |
| *F28D 7/10* | (2006.01) |
| *F28F 9/02* | (2006.01) |
| *B60H 1/00* | (2006.01) |
| *F28D 7/14* | (2006.01) |

(52) U.S. Cl.
CPC ............ *F28D 7/106* (2013.01); *F28F 9/0246* (2013.01); *B60H 1/00321* (2013.01); *F28D 7/14* (2013.01); *F28F 2009/0287* (2013.01)

(58) Field of Classification Search
CPC .......... F28D 7/106; F28D 7/14; F28F 9/0246; F28F 2009/0287; B60H 1/00321
USPC ....................................................... 165/177
See application file for complete search history.

(56) References Cited

U.S. PATENT DOCUMENTS

| | | |
|---|---|---|
| D819,186 S | 5/2018 | Huh et al. |
| 2013/0146262 A1 | 6/2013 | Huh et al. |
| 2014/0060786 A1* | 3/2014 | Choi ................ F28D 7/024 165/156 |

FOREIGN PATENT DOCUMENTS

| | | |
|---|---|---|
| KR | 10-1211637 | 12/2012 |
| KR | 10-2016-0119378 | 10/2016 |

OTHER PUBLICATIONS

Office Action dated Jun. 10, 2020 from related Korean Patent Application No. 119981116314 (10 pages including English translation).

* cited by examiner

*Primary Examiner* — Davis D Hwu
(74) *Attorney, Agent, or Firm* — Crowell & Moring LLP; John C. Freeman, Esq.

(57) ABSTRACT

A double-pipe heat exchanger including a heat exchange pipe and an integrated connector. The heat exchange pipe may include an inner pipe forming a first flow path, and an outer pipe accommodating the inner pipe therein and forming a second flow path outside the inner pipe. The integrated connector may include a main body including, at one side thereof, a heat exchange pipe engaging part with which one end of the heat exchange pipe is combined, a first connector flow path portion formed to be connected to the first flow path and discharging a first fluid flowing from the first flow path to an outside of the main body, and a second connector flow path portion formed to be connected to the second flow path and supplying a second fluid from the outside of the main body to the second flow path.

5 Claims, 6 Drawing Sheets

Prior Art

DOUBLE-PIPE HEAT EXCHANGER INCLUDING INTEGRATED CONNECTOR

CROSS-REFERENCE TO RELATED APPLICATION(S)

This application is based on and claims priority under 35 U.S.C. § 119 to Korean Patent Application No. 10-2019-0066009, filed on Jun. 4, 2019, in the Korean Intellectual Property Office, the entire disclosure of which is incorporated herein by reference.

BACKGROUND

Field

The disclosure relates to a double-pipe heat exchanger, and more particularly, to a double-pipe heat exchanger easily manufactured and efficiently installed through an improved structure of a connector connected to a heat exchange pipe.

Description of Related Art

An air conditioning system for a vehicle is a device installed in the vehicle to blow cold air into a vehicle interior.

In such an air conditioning system, a cooling system is generally composed of a compressor, a condenser, an expansion valve, and an evaporator which are connected by a refrigerant pipe and thereby form a refrigeration cycle. In the cooling system, the compressor compresses and delivers refrigerant, and the condenser liquefies and condenses the high-pressure refrigerant sent from the compressor. In addition, the expansion valve depressurizes the refrigerant liquefied and condensed by the condenser, and the evaporator evaporates the low-pressure liquid refrigerant depressurized by the expansion valve through a heat exchange with air blown into the vehicle interior. Thus, the air discharged into the vehicle interior is cooled through an endothermic action by latent heat of evaporation of the refrigerant.

In order to improve the cooling performance of the air conditioning system, there is a need for a device capable of super-cooling the high-temperature and high-pressure liquid refrigerant expanded by the expansion valve and for optimizing the superheat degree of the refrigerant discharged from the evaporator. According to this need, a cooling system that has been recently developed is often using a double-pipe heat exchanger installed at an inlet of the expansion valve and an inlet of the compressor. This double-pipe heat exchanger is configured to include a heat exchange pipe and a fluid inlet/outlet connector. The heat exchange pipe includes an inner pipe forming a low-pressure flow path through which a low-temperature low-pressure refrigerant flows, and an outer pipe making a double-pipe structure with the inner pipe and forming a high-pressure flow path through which a high-temperature high-pressure refrigerant flows. The fluid inlet/outlet connector introduces and discharges the high-temperature high-pressure refrigerant into and from a space between the inner and outer pipes.

In the air conditioning system using the double-pipe heat exchanger, a suction pipe for delivering the low-temperature low-pressure gaseous refrigerant from the evaporator to the compressor, and a liquid pipe for transferring the high-temperature high-pressure liquid refrigerant from the condenser to the expansion valve are disposed close to each other inside the heat exchange pipe so that a heat exchange is performed between the low-temperature gaseous refrigerant and the high-temperature liquid refrigerant.

As shown in FIG. 1, a typical double-pipe heat exchanger includes an expanded pipe type connector 20 connected to a heat exchange pipe 10. The expanded pipe type connector 20 are connected to both a first branch pipe 30 for guiding a low-temperature low-pressure refrigerant to a suction pipe (not shown) and a second branch pipe 40 for guiding a high-temperature high-pressure refrigerant to a liquid pipe (not shown). A connection block 50 connects the branch pipes 30 and 40 to the suction pipe and the liquid pipe.

As such, the typical double-pipe heat exchanger needs the expanded pipe type connector 20 to connect both the suction pipe and the liquid pipe to the heat exchange pipe 10, and the expanded pipe type connector 20 should be manufactured through a pipe expanding process. Therefore, the typical double-pipe heat exchanger has a problem in that the manufacturing process is complicated and the manufacturing cost is high.

In addition, the typical double-pipe heat exchanger used in the vehicle cooling system needs to minimize a space required for installation due to the spatial limitation of an installation site. Further, the typical double-pipe heat exchanger needs to secure a wide range of design freedom in piping connection with other components of the air conditioning system such as the compressor or the evaporator.

However, in the typical double-pipe heat exchanger, because the respective branch pipes 30 and 40 and the connection block 50 are all connected to the expanded pipe type connector 20 connected to the heat exchange pipe 10, it is not easy to secure an installation space when installing the double-pipe heat exchanger in the vehicle. Moreover, there is a problem that various design changes are difficult.

In addition, because the typical double-pipe heat exchanger requires to separately manufacture the heat exchange pipe 10, the expanded pipe type connector 20, the branch pipes 30 and 40, and the connection block 50, and then assemble and weld them, there is a problem that a lot of assembly process and assembly time are required.

SUMMARY

The present disclosure provides a double-pipe heat exchanger that allows two kinds of refrigerants, i.e., a high-temperature high-pressure refrigerant and a low-temperature low-pressure refrigerant, to be supplied to and discharged from a heat exchange pipe through one connector.

According to the disclosure, a dual-pipe heat exchanger may include a heat exchange pipe and an integrated connector. The heat exchange pipe may include an inner pipe forming a first flow path, and an outer pipe accommodating the inner pipe therein and forming a second flow path outside the inner pipe. The integrated connector may include a main body including, at one side thereof, a heat exchange pipe engaging part with which one end of the heat exchange pipe is combined, a first connector flow path portion formed to be connected to the first flow path and discharging a first fluid flowing from the first flow path to an outside of the main body, and a second connector flow path portion formed to be connected to the second flow path and supplying a second fluid from the outside of the main body to the second flow path.

BRIEF DESCRIPTION OF THE DRAWINGS

The above and other aspects, features and advantages of certain embodiments of the disclosure will be more apparent from the following detailed description, taken in conjunction with the accompanying drawings.

DETAILED DESCRIPTION

Figure 1:
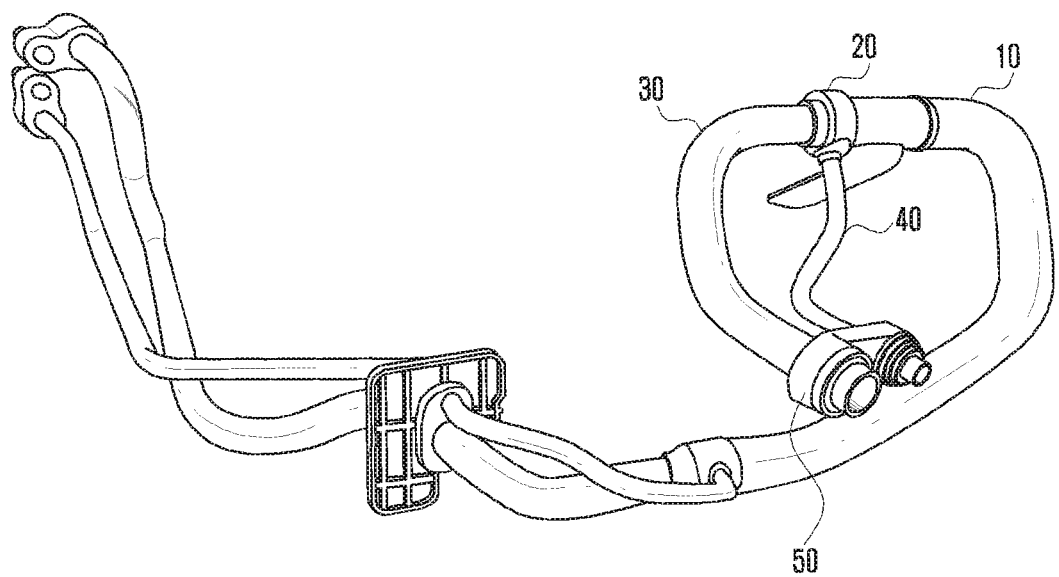
FIG. 1 is a perspective view showing a typical double-pipe heat exchanger.

Now, embodiments of the disclosure will be described in detail with reference to the accompanying drawings. In the following, descriptions of techniques that are well known in the art and not directly related to the disclosure are omitted. This is to clearly convey the subject matter of the disclosure by omitting any unnecessary explanation. In the drawings, the same or corresponding elements are denoted by the same reference numerals.

Figure 2:
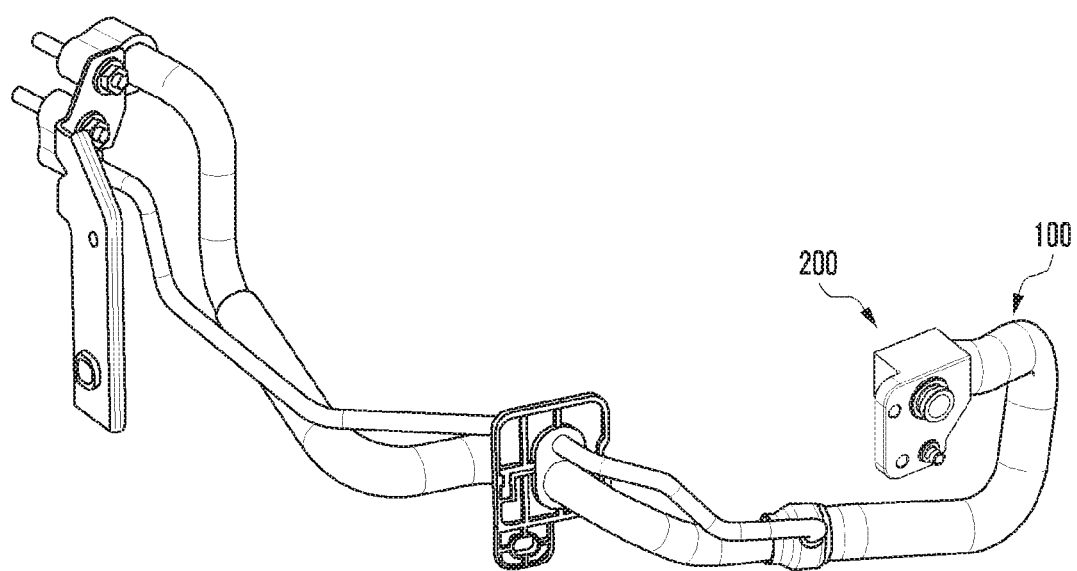
FIG. 2 is a perspective view showing a double-pipe heat exchanger according to an embodiment of the disclosure.
Figure 3:
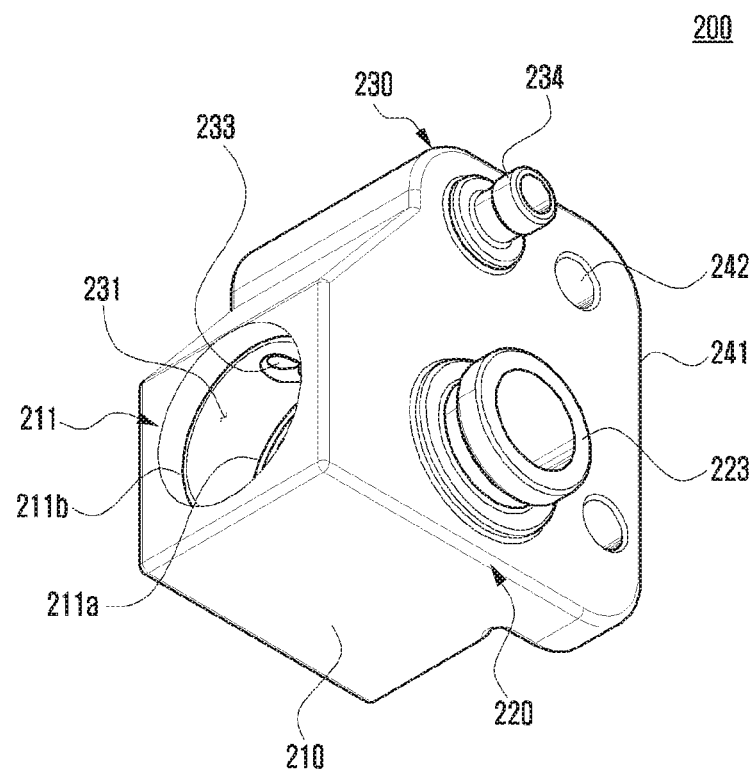
FIG. 3 is a perspective view showing a structure of an integrated connector according to an embodiment of the disclosure.
Figure 4:
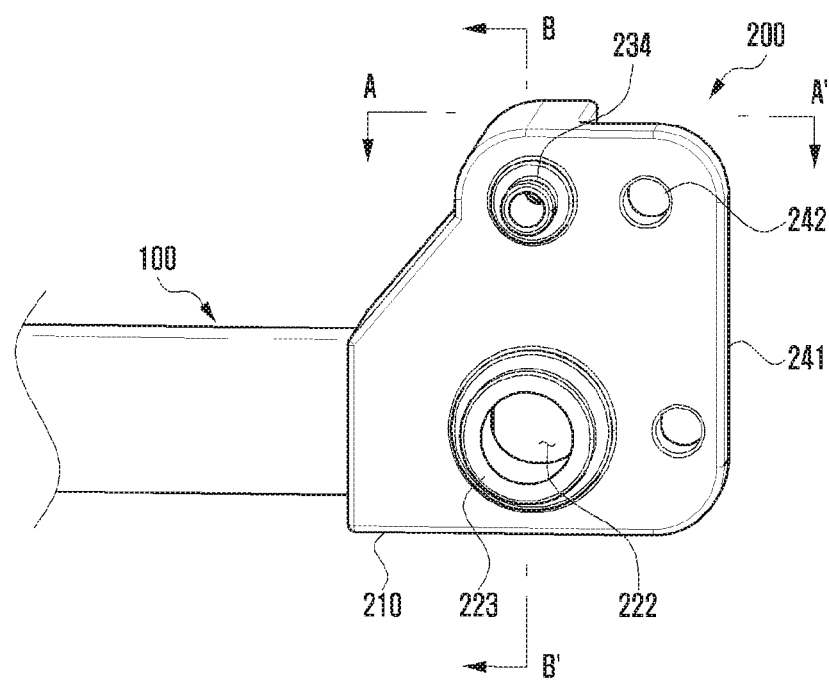
FIG. 4 is a view schematically showing a structure in which a heat exchange pipe according to an embodiment of the disclosure is combined with an integrated connector.
Figure 5:
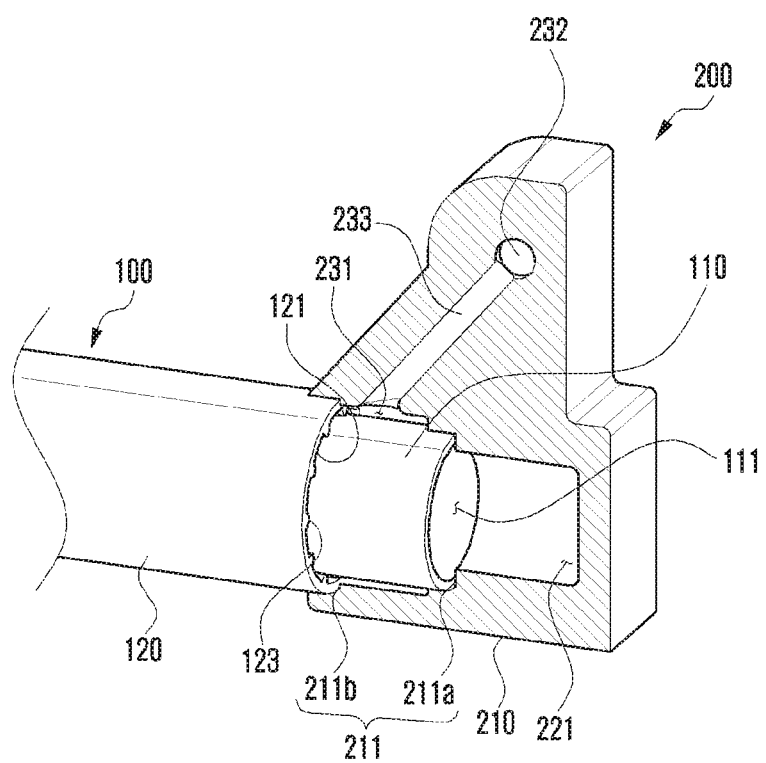
FIG. 5 is a view showing a state in which the heat exchange pipe is combined with the integrated connector and showing a cross-section taken along line A-A' of FIG. 4.
Figure 6:
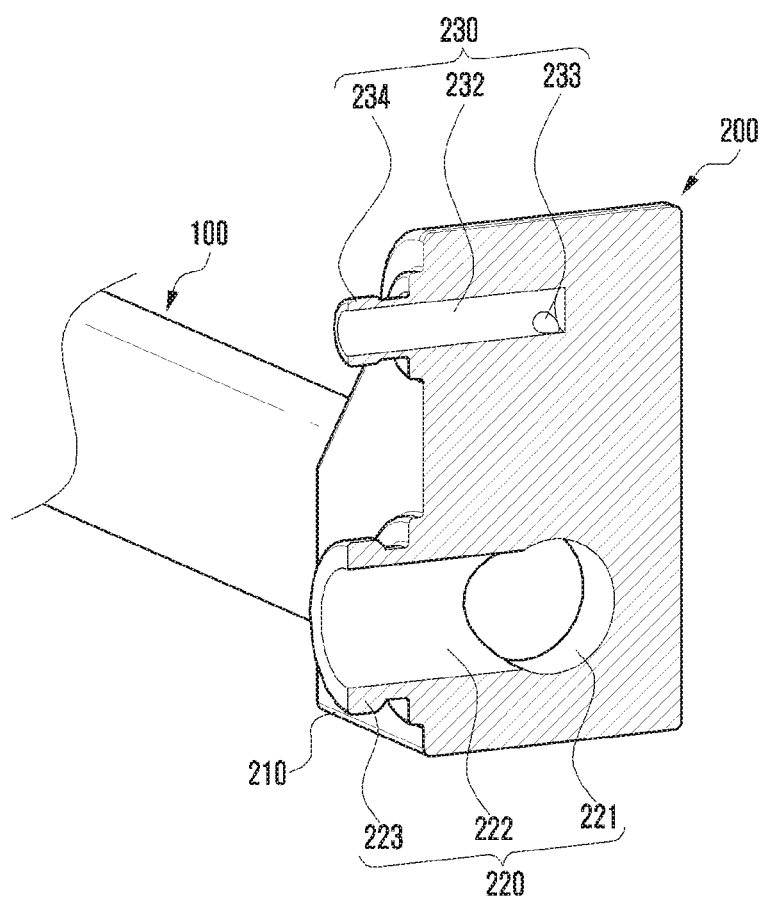
FIG. 6 is a view showing a state in which the heat exchange pipe is combined with the integrated connector and showing a cross-section taken along the line B-B' of FIG. 4.

FIG. 2 is a perspective view showing a double-pipe heat exchanger according to an embodiment of the disclosure. FIG. 3 is a perspective view showing a structure of an integrated connector according to an embodiment of the disclosure. FIG. 4 is a view schematically showing a structure in which a heat exchange pipe according to an embodiment of the disclosure is combined with an integrated connector. FIG. 5 is a view showing a state in which the heat exchange pipe is combined with the integrated connector and showing a cross-section taken along line A-A' of FIG. 4. FIG. 6 is a view showing a state in which the heat exchange pipe is combined with the integrated connector and showing a cross-section taken along the line B-B' of FIG. 4.

Referring to FIGS. 2 and 5, the double-pipe heat exchanger according to an embodiment of the disclosure includes a heat exchange pipe 100 and an integrated connector 200.

As shown in FIG. 5, the heat exchange pipe 100 includes an inner pipe 110 forming a first flow path 111 therein, and an outer pipe 120 accommodating the inner pipe 110 therein and forming a second flow path 121 outside the inner pipe 110.

The inner pipe 110 provides the first flow path 111 through which a first fluid flows. The first fluid may be a low-temperature refrigerant supplied to a compressor in a vehicle cooling system, or may be a high-temperature refrigerant supplied to an expansion valve in the vehicle cooling system.

Although not shown in detail, the inner pipe 110 may have protrusions that protrude from an inner circumferential surface of the inner pipe 110 toward a center of the inner pipe 110 at a certain height in a radial direction of the inner pipe 110.

In addition, the protrusions are extended straightly in a longitudinal direction of the inner pipe 110 on the inner circumferential surface of the inner pipe 110. The height of each protrusion is not particularly limited. The protrusions are spaced apart from each other at regular intervals on the inner circumferential surface of the inner pipe 110. In order to increase heat transfer efficiency, a plurality of protrusions are preferable rather than a single protrusion.

Such protrusions formed in the inner pipe 110 are merely optional, and the inner pipe 110 without protrusions may also be used for the double-pipe heat exchanger.

The outer pipe 120 is manufactured separately from the inner pipe 110, and is manufactured in a size allowing the inner pipe 110 to be inserted.

As shown in FIG. 5, the outer pipe 120 may have a plurality of protrusions 123 that protrude from an inner circumferential surface of the outer pipe 120 toward a center of the outer pipe 120 at a certain height in a radial direction of the outer pipe 120.

In addition, the protrusions 123 are extended straightly in a longitudinal direction of the outer pipe 120 on the inner circumferential surface of the outer pipe 120. The height of each protrusion is not particularly limited. However, as the inner pipe 110 should be able to be inserted, it is preferable that the diameter of a virtual circle formed by connecting ends of the protrusions 123 is equal to or greater than the outer diameter of the inner pipe 110.

Because the inner pipe 110 is manufactured separately from the outer pipe 120 and inserted into the outer pipe 120, it is desirable that the protrusions 123 of the outer pipe 120 are formed to have heights allowing the ends of the protrusions 123 to be in contact with or in close proximity to the outer circumferential surface of the inner pipe 110. Thus, the inner pipe 110 can maintain a stable position in an inserted state.

When the inner pipe 110 is inserted into the outer pipe 120, the protrusions 123 of the outer pipe 120 produce a plurality of second flow paths 121 between the inner pipe 110 and the outer pipe 120. The second flow paths 121 are provided for a flow of a second fluid which is different from the first fluid.

The second fluid has different characteristics from the first fluid. The second fluid may be a low-temperature refrigerant supplied to the compressor in the vehicle cooling system, or may be a high-temperature refrigerant supplied to the expansion valve in the vehicle cooling system.

When the first fluid flowing through the inner pipe 110 is a low-temperature refrigerant, the second fluid flowing through the outer pipe 120 is a high-temperature refrigerant. In contrast, when the first fluid is a high-temperature refrigerant, the second fluid is a low-temperature refrigerant. The first and second fluids are sufficient to have only different physical properties so that they can exchange heat with each other, and it is not necessary to have specific temperature and pressure conditions.

Referring to FIGS. 3 to 6, the integrated connector 200 according to an embodiment of the disclosure is combined with one end of the heat exchange pipe 100, thus being integrally formed with the heat exchange pipe 100.

The integrated connector 200 may contain therein a first space for discharging the first fluid from the first flow path 111 to the outside, and a second space for supplying the second fluid from the outside to the second flow path 121. In order to prevent the first fluid and the second fluid from being mixed together, it is preferable that the first and second spaces are formed to be partitioned.

The integrated connector 200 may include a main body 210, a first connector flow path portion 220, and a second connector flow path portion 230.

The main body 210 forms an external appearance of the integrated connector 200. The main body 210 may include, at one side thereof, a heat exchange pipe engaging part 211 with which one end of the heat exchange pipe 100 is combined.

Referring to FIGS. 3 and 5, the heat exchange pipe engaging part 211 may include a first engaging groove 211a and a second engaging groove 211b. The first engaging groove 211a is formed at one side of a first accommodation space 221, which will be described later, and allows one end of the inner pipe 110 to be tightly fitted. Similarly, the second engaging groove 211b is formed at one side of a second accommodation space 231, which will be described later, and allows one end of the outer pipe 120 to be tightly fitted.

A process of combining the heat exchange pipe 100 with the integrated connector 200 is performed by tightly fitting one end of the inner pipe 110 into the first engaging groove 211a, tightly fitting one end of the outer pipe 120 into the second engaging groove 211b, and then welding the one end of the outer pipe 120.

Accordingly, by combining the heat exchange pipe 100 with the integrated connector 200 through one assembly and welding process, the double-pipe heat exchanger according to an embodiment of the disclosure can be manufactured with a reduced time and a simplified process.

Referring to FIGS. 5 and 6, the first connector flow path portion 220 is formed to be connected to the first flow path 111 and discharges the first fluid flowing from the first flow path 111 to the outside of the main body 210.

The first connector flow path portion 220 may include the first accommodation space 221, a first passage 222, and a first port 223.

The first accommodation space 221 may be formed inside the main body 210 and connected to one end of the inner pipe 110. As described above, one end of the inner pipe 110 is tightly fitted into the first engaging groove 211a formed at one side of the first accommodation space 221, so that the first flow path 111 and the first accommodation space 221 are connected to each other. Thus, the first fluid discharged from the first flow path 111 is temporarily accommodated in the first accommodation space 221.

The first passage 222 is formed to be connected to the first accommodation space 221 in a direction perpendicular to the first accommodation space 221. The first fluid accommodated in the first accommodation space 221 is moved through the first passage 222 to be discharged to the outside of the main body 210.

The first port 223 is formed to protrude on the outer surface of the main body 210 and to be connected to the first passage 222. The first port 223 allows the first fluid moved through the first passage 222 to be discharged to the outside of the main body 210.

That is, in a state where the inner pipe 110 of the heat exchange pipe 100 is combined through the first engaging groove 211a, the first connector flow path portion 220 allows the first fluid discharged through the first flow path 111 of the inner pipe 110 to be discharged to the outside of the main body 210 through the first accommodation space 221, the first passage 222, and the first port 223.

Referring again to FIGS. 5 and 6, the second connector flow path portion 230 is formed to be connected to the second flow path 121 and supplies the second fluid from the outside of the main body 210 to the second flow path 121.

The second connector flow path portion 230 may include the second accommodation space 231, a second passage 232, an inclined passage 233, and a second port 234.

The second accommodation space 231 may be formed inside the main body 210 to be distinguished from the first accommodation space 221 and connected to one end of the outer pipe 120. As described above, one end of the outer pipe 120 is tightly fitted into the second engaging groove 211b formed at one side of the second accommodation space 231, so that the second flow path 121 and the second accommodation space 231 are connected to each other. Thus, the second fluid supplied from the outside of the main body 210 is temporarily accommodated in the second accommodation space 231.

The second passage 232 is formed in a direction perpendicular to the second accommodation space 231, and the second fluid supplied from the outside of the main body 210 is moved through the second passage 232 to the second accommodation space 231.

The inclined passage 233 is connected at one end thereof to the second accommodation space 231 and also connected at the other end thereof to the second passage 232. Thus, the inclined passage 233 allows the second fluid to move from the second passage 232 to the second accommodation space 231.

The inclined passage 233 is preferably formed to be inclined at an angle from the end of the second passage 232 toward the second accommodation space 231. This is to form a path connecting the second passage 232 and the second accommodation space 231 as the shortest path inside the main body 210. As a result, the volume of the integrated connector 200 can be reduced as much as possible.

The second port 234 is formed to protrude on the outer surface of the main body 210 and to be connected to the second passage 232. The second port 234 allows the second fluid to be supplied from the outside of the main body 210.

That is, in a state where the outer pipe 120 of the heat exchange pipe 100 is combined through the second engaging groove 211b, the second connector flow path portion 230 allows the second fluid to be supplied from the outside of the main body 210 to the second flow path 121 of the outer pipe 120 through the second port 234, the second passage 232, the inclined passage 233, and the second accommodation space 231.

As described above, inside the main body 210 of the integrated connector 200, the first passage 222 is formed in a direction perpendicular to the first accommodation space 221, and the second passage 232 is formed in a direction perpendicular to the second accommodation space 231 through the inclined passage 233. This results in an advantage of making the integrated connector 200 as compact as possible.

Meanwhile, the integrated connector 200 may further include a connector mounting portion 240 provided on a side of the main body 210 opposite to the side with which the heat exchange pipe 100 is combined.

The connector mounting portion 240 may include a mounting plate 241 protruding from one side of the main body 210 and at least one engaging hole 242 formed in the mounting plate 241.

For example, although not shown, the integrated connector 200 combined with the heat exchange pipe 100 can be simply joined to the expansion valve by attaching one side of the expansion valve to the mounting plate 241 and inserting a bolt (not shown) into both the engaging hole 242 and a fastening hole (not shown) formed on the expansion valve.

As described above, the integrated connector 200 according to an embodiment of the disclosure includes the first connector flow path portion 220 and the second connector flow path portion 230 formed inside the main body 210 such that two kinds of refrigerants, i.e., a high-temperature high-pressure refrigerant and a low-temperature low-pressure refrigerant, can be supplied to and discharged from the heat exchange pipe 100 through one connector. Accordingly, there is an advantage that the size of the double-pipe heat exchanger can be reduced as much as possible.

Hereinafter, an assembling process and operation of the double-pipe heat exchanger according to an embodiment of the disclosure will be described.

First, the heat exchange pipe 100 is combined with the heat exchange pipe engaging part 211 formed in the main body 210 of the integrated connector 200. Specifically, the inner pipe 110 of the heat exchange pipe 100 passes through the second engaging groove 211b formed in the second connector flow path portion 230 and is tightly fitted into the first engaging groove 211a formed in the first connector flow path portion 220. At the same time, the outer pipe 120 of the heat exchange pipe 100 is tightly fitted into the second engaging groove 211b formed in the second connector flow path portion 230. In this state, a part of the outer pipe 120 is welded to the main body 210.

Through this process, the heat exchange pipe 100 and the integrated connector 200 are combined with each other and integrally form the double-pipe heat exchanger.

After formed, the double-pipe heat exchanger operates as follows. The first fluid is discharged from the first flow path 111 of the inner pipe 110, accommodated in the first accommodation space 221, and then discharged to the outside through the first passage 222 and the first port 223. The second fluid is supplied from the outside through the second port 234, accommodated in the second accommodation space 231 through the second passage 232 and the inclined passage 233, and then supplied to the second flow path 121 formed between the inner pipe 110 and the outer pipe 120.

A heat exchange is performed between the first fluid flowing along the first flow path 111 and the second fluid flowing along the second flow path 121.

According to the present disclosure, the double-pipe heat exchanger allows two kinds of refrigerants, i.e., a high-temperature high-pressure refrigerant and a low-temperature low-pressure refrigerant, to be supplied to and discharged from the heat exchange pipe through the integrated connector. Thus, the double-pipe heat exchanger of the disclosure does not need typical branch pipes and a typical connection block, thereby being easily installed in a minimized space in a vehicle.

In addition, the double-pipe heat exchanger of the disclosure not only allows various design modifications, but also has an improved efficiency because of being able to increase the length of the heat exchange pipe.

Furthermore, because of applying the integrated connector, the double-pipe heat exchanger of the disclosure does not need a process of manufacturing a typical expanded pipe type connector and typical branch pipes, thereby simplifying a manufacturing process and reducing manufacturing cost.

While the disclosure has been particularly shown and described with reference to exemplary embodiments thereof, it will be understood by those skilled in the art that various changes in form and details may be made therein without departing from the scope of the subject matter as defined by the appended claims.

What is claimed is:
1. A dual-pipe heat exchanger comprising:
a heat exchange pipe comprising:
an inner pipe forming a first flow path; and
an outer pipe accommodating the inner pipe therein and forming a second flow path outside the inner pipe; and an integrated connector comprising:
a main body comprising, at one side thereof, a heat exchange pipe engaging part with which one end of the heat exchange pipe is combined;
a first connector flow path portion formed inside the main body and connected to the first flow path and discharging a first fluid flowing from the first flow path to an outside of the main body; and
a second connector flow path portion formed inside the main body and to be connected to the second flow path and supplying a second fluid from the outside of the main body to the second flow path;
wherein the first connector flow path portion comprises:
a first accommodation space formed inside the main body and connected to one end of the inner pipe such that the first fluid discharged from the first flow path is accommodated in the first accommodation space;
a first passage formed to be connected to the first accommodation space in a direction perpendicular to the first accommodation space such that the first fluid accommodated in the first accommodation space is moved through the first passage; and
a first port formed to protrude on an outer surface of the main body and to be connected to the first passage so as to allow the first fluid moved through the first passage to be discharged to the outside of the main body; and
wherein the second connector flow path portion comprises:
a second accommodation space formed inside the main body to be distinguished from the first accommodation space and connected to one end of the outer pipe such that the second fluid supplied from the outside of the main body is accommodated in the second accommodation space;
a second passage formed in a direction perpendicular to the second accommodation space such that the second fluid supplied from the outside of the main body is moved through the second passage to the second accommodation space;
an inclined passage connected at one end thereof to the second accommodation space and also connected at an other end thereof to the second passage to be inclined at an angle from an end of the second passage toward the second accommodation space so as to allow the second fluid to move from the second passage to the second accommodation space; and
a second port formed to protrude on the outer surface of the main body and to be connected to the second passage so as to allow the second fluid to be supplied from the outside of the main body;
wherein a virtual line connecting the first port and the second port is positioned in a direction perpendicular to a flow of the first fluid and the second fluid moving in the dual-pipe heat exchanger;
the dual-pipe heat exchanger and the integrated connector are combined integrally formed with the heat exchange pipe engaging part by a welding process; and
wherein the integrated connector is positioned on a side of the main body where the first port and the second port are positioned and comprises a mounting plate for attaching an expansion valve connecting the first port and the second port.
2. The dual-pipe heat exchanger of claim 1, wherein the heat exchange pipe engaging part comprises:

a first engaging groove formed at one side of the first accommodation space and allowing one end of the inner pipe to be tightly fitted therein; and a second engaging groove formed at one side of the second accommodation space and allowing one end of the outer pipe to be tightly fitted therein.

3. The dual-pipe heat exchanger of claim 2, wherein the heat exchange pipe is combined with the integrated connector by tightly fitting one end of the inner pipe into the first engaging groove, tightly fitting one end of the outer pipe into the second engaging groove, and then welding the one end of the outer pipe.

4. The dual-pipe heat exchanger of claim 1, wherein the first fluid is a low-temperature refrigerant and the second fluid is a high-temperature refrigerant.

5. The dual-pipe heat exchanger of claim 1, wherein the first fluid is a high-temperature refrigerant and the second fluid is a low-temperature refrigerant.

* * * * *